Patented Aug. 26, 1930

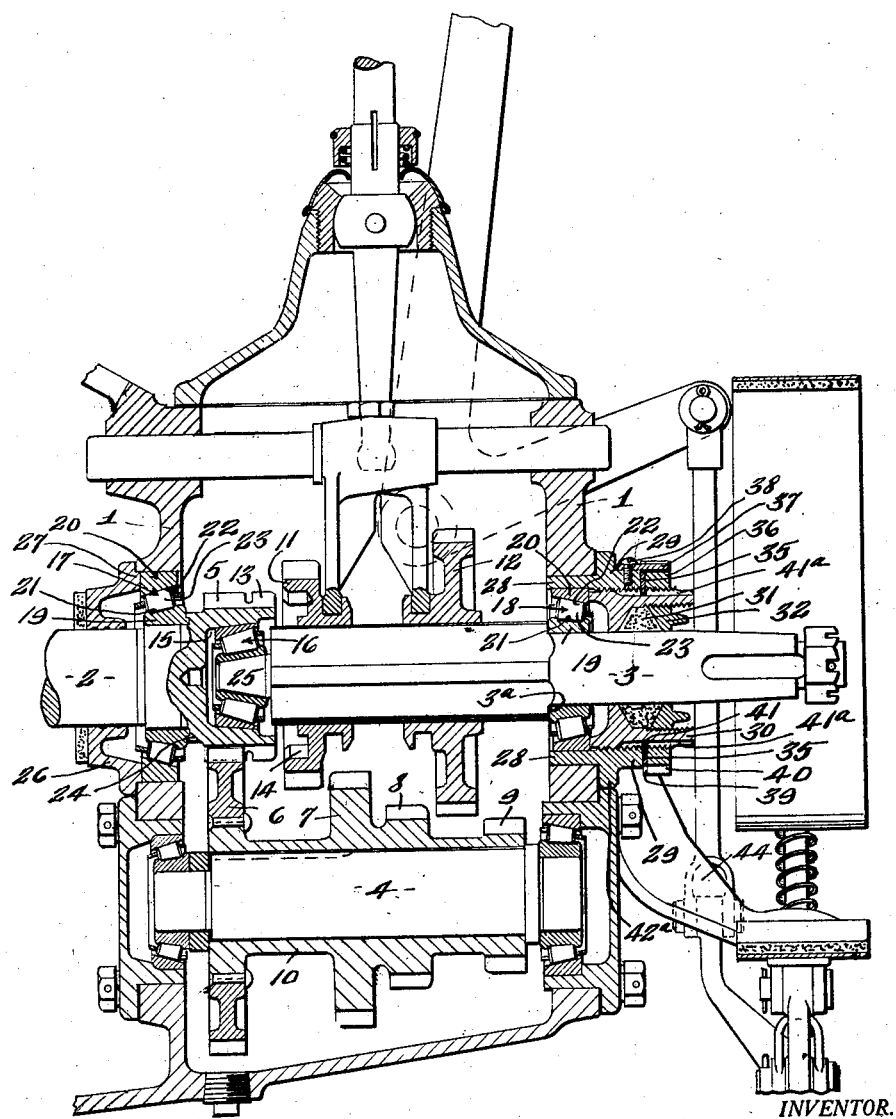

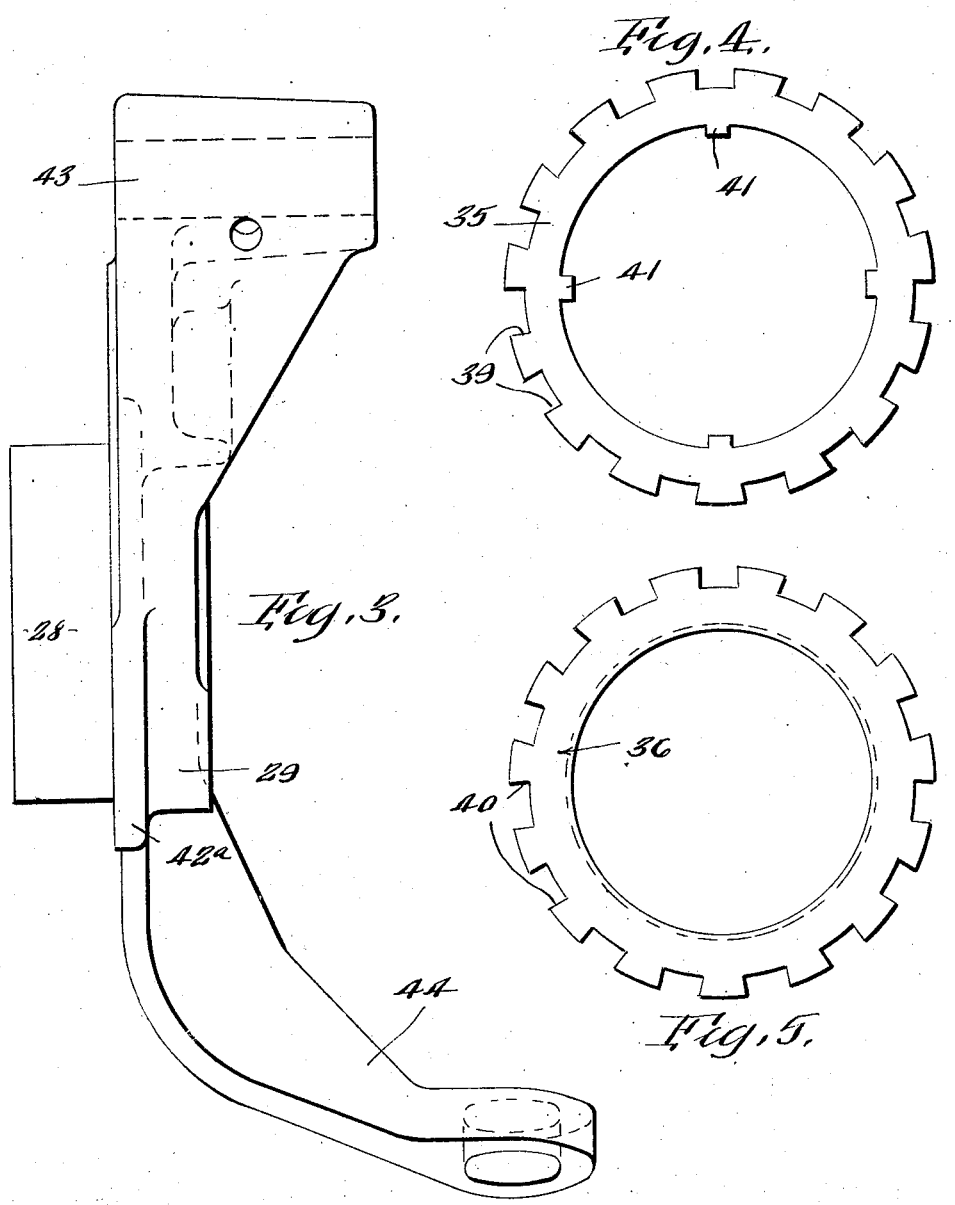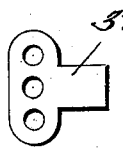

1,774,160

UNITED STATES PATENT OFFICE

HENRY W. SWEET, OF SYRACUSE, NEW YORK, ASSIGNOR TO BROWN-LIPE GEAR COMPANY, OF SYRACUSE, NEW YORK, A CORPORATION OF NEW YORK

TRANSMISSION GEARING

Application filed January 10, 1923. Serial No. 611,869.

This invention relates to transmission gearings, such as are used in motor vehicles and has for its object a particularly simple, efficient, durable and readily operable means for adjusting the bearings on the principal shafts of the gearing and for supporting a brake mechanism.

The invention consists in the noval features and in the combinations and constructions hereinafter set forth and claimed.

In describing this invention, reference is had to the accompanying drawings, in which like characters designate corresponding parts in all the views.

Figure 2 is a longitudinal vertical sectional view taken centrally of Fig. 1.

Figure 3 is a detail view of the cup-shaped member supporting the bearing adjusting means and the brake band and operating means.

Figure 1:
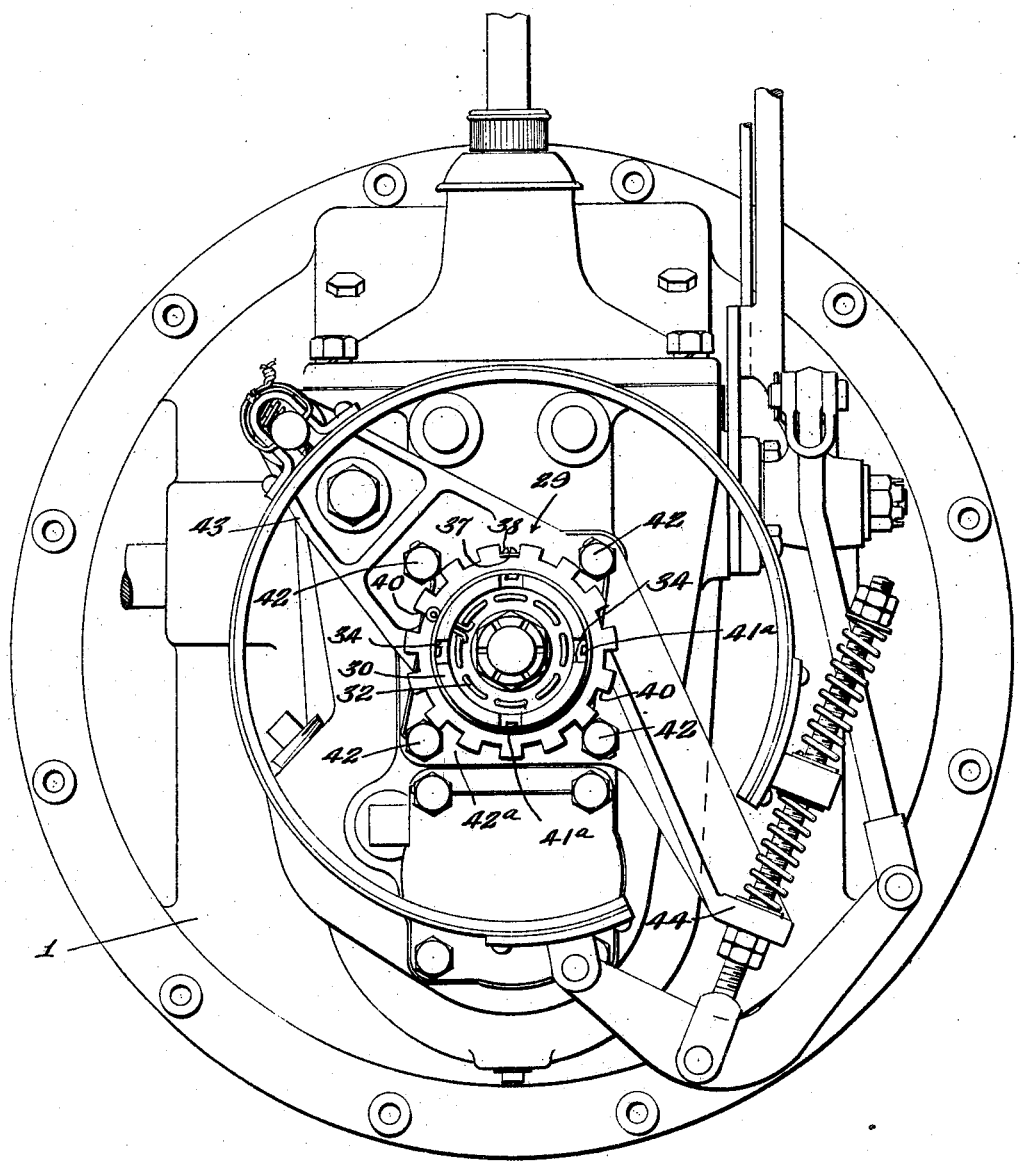
Figure 1 is an end elevation of the transmission gearing provided with my invention.

Figures 4, 5, and 6 are detail views of the means for holding the bearing adjusting member in its adjusted position.

This transmission gearing comprises generally a housing or case provided with a journal bearing in one wall thereof, such bearing being adjustable axially and means operable from the outside of the case for adjusting the axially adjustable bearing and holding the same in its adjusted position.

The invention further comprises an arrangement of bearings by which a plurality of bearings are adjusted or taken up by a single bearing adjusting means.

The illustrated embodiment of my transmission gearing further includes means detachably mounted on the wall of the case concentric with the driven shaft and preferably supporting the adjustable bearing for such shaft and the adjusting means therefor for supporting the brake band and a portion of the operating means therefor.

1 designates the case which may be of any suitable form, size, and construction.

2 and 3 are alined driving and driven shafts.

4 is a counter or jack shaft all journalled in the case.

5 designates the gear on the driving shaft 2, meshing with the gear 6 rotatable with the jack shaft 4.

7, 8, and 9 are additional gears rotatable with the jack shaft 4, these gears 6, 7, 8, and 9 being here shown as mounted upon a single hub 10. 11 and 12 are gears rotatable with the driven shaft and shiftable axially thereon in any suitable manner into and out of mesh respectively with the gear 7 and with the gears 8 and 9.

The gear 5 is formed with an external clutch face 13 and the gear 11 with an internal clutch face 14 and such gear 11 is also shiftable axially to engage the clutch faces 13 and 14. When so engaged, the driven shaft 3 is actuated directly by the driving shaft 2.

The construction and arrangement of the shafts and the gears of this gearing form no part of this invention and as the construction and operation of this type of transmission gearing is well known, further description is thought to be unnecessary.

The driving and driven shafts 2 and 3 are mounted in oppositely disposed conical bearings located in opposite end walls of the case 1 and also the driven shaft 3 is mounted in a conical bearing located in a socket 15 in the inner end of the drive shaft 2, this bearing 16 in the socket 15 having the same inclination as the bearing 17 of the drive shaft 2; and the bearing 18 for the driven shaft having an opposite inclination to that of the bearings 16 and 17. The drive shaft 2 is connected through suitable clutch mechanism to the engine shaft, as will be understood by those skilled in the art.

Each bearing 16, 17, or 18 as here illustrated, consists of inner and outer rings 19 and 20, having opposing conical faces 21 and 22 and rollers 23 between said faces, such bearings being adjustable axially of the shaft. The driven shaft is provided with a shoulder 3ª abutting against the inner edge of the inner ring 19 and likewise the driving shaft 2 is provided with a shoulder 24 abutting against the inner edge face of the inner ring of its bearing 17. The inner ring of the bearing 16 is mounted on the conical reduced portion 25 of the driven shaft 3. The conical faces 21 of the inner ring of each bearing is the bottom of a groove so that the rollers are held from endwise movement relatively to the inner ring. The relative movement of the bearings 16, 17, and 18, and the shafts 2, 3 is such that axial movement of the bearing 20 inwardly to the left thrusts the driven shaft 3 inwardly, or to the left, Fig. 2 and tightens or adjusts all of the bearings 16, 17, and 18. Hence upon adjusting movement of the bearing 18 all of such bearings will be correspondingly adjusted.

The bearing 17 is held from outward axial movement by a cap 26 on the outside of the case and having a shoulder 27 thrusting against the outer face of the outer ring of the bearing 17. This cap 26 is secured to the case in any suitable manner and is provided with an axial opening through which the driving shaft 2 extends.

The means for adjusting the bearing 18 axially is exposed on and operable from the outside of the case and is arranged concentric with the driven shaft 3 which extends through the case to the outside thereof for connection to the propeller shaft through a universal joint in any suitable manner.

In the illustrated embodiment of my invention, the bearing 18 is supported in tubular portion 28 of a hub or cup-shaped part 29, the tubular portion extending into an opening in the wall of the case, and the outer bearing ring 20 being located in such tubular portion, and the adjusting means comprises a member supported in the cup-shaped member or hub 29 and adjustable axially thereof and thrusting against the bearing 18 and preferably the outer ring 20 thereof. This adjusting member as here illustrated comprises a ring or plug 30 threading into the cup-shaped member 29 and thrusting against the outer ring 20 of the bearing 18, such plug or ring also engaging the periphery of the shaft 3 and being here shown as carrying a packing 31 which engages the periphery of the shaft. The packing is held in position by the annular plug 32 threading into the plug 30 against the packing 31.

For the purpose of operating the adjusting member 30 it is provided at its outer edge with a plurality of notches 34 for receiving a suitable tool or wrench. Obviously, by turning the adjustment member in one direction, the bearing 18 will be thrust axially and tightened and as the bearing thrusts against the shoulder 3ª of the driven shaft 3, this shaft will be thrust axially, slightly adjusting the bearings 16 and 17.

The adjusting member 30 is held in its adjusted position by means coacting with the hub or cap 29. As here illustrated, such means comprises a flat ring or washer 35, a nut 36 threading on the adjusting member 30 against the washer and thrusting the washer against the end face of the hub or cap 29 and the locking means, as the tongue 37 fixed, as by screws 38, to the periphery of the hub or cup-shaped member 29 and extending into two alined notches 39, 40, provided in the peripheries of the washer 35 and nut 36. The washer 35 is provided with one or more internal tongues 41 which extend into lengthwise grooves 41ª formed in the adjusting member 30.

To adjust the adjusting member 30 the screws 38 are removed to detach the lock 37 and the nut 36 loosened and the member 30 turned in the cup-shaped part 29. When this adjustment is effected, the nut 36 is again tightened and the locking member 37 replaced.

The cup-shaped part or hub 29 is detachably secured to the end wall of the case and as here shown it is secured thereto by fastening members as screws 42 extending through openings in the flange 42ª of the hub and threading into the wall of the case, the flange 42ª lapping or abutting against the outer face of such wall.

The brake band of the transmission brake and the operating means thereof forms the subject matter of divisional application Serial No. 681,743, filed December 20, 1923.

By my invention, the main bearings of the rotatable element, consisting of a driving and driven shaft 2, 3, can be readily adjusted to take up for wear from a single point and the brake mechanism is readily applied to the transmission case.

What I claim is:—

In a transmission gearing, a case provided with a bearing comprising an axially adjustable member, a shaft mounted in the bearing, a cup-shaped member carried by the case on the outside thereof concentric with the axis of the shaft and a bearing adjusting member threading into the cup-shaped part and thrusting against the bearing, the bearing member being formed with peripheral lengthwise grooves and means for holding the bearing adjusting member in its adjusted position comprising a ring having a tongue for entering said groove, a nut threading on the bearing adjusting member against the ring to press the ring against the end face of the cup-shaped member, the ring and the nut having alined peripheral notches and a lock carried by the cup-shaped member and extending into said notches, substantially as and for the purpose specified.

In testimony whereof, I have hereunto signed my name, at Syracuse, in the county of Onondaga, and State of New York, this 29th day of December, 1922.

HENRY W. SWEET.